(12) United States Patent
Regelmann

(10) Patent No.: US 11,793,607 B2
(45) Date of Patent: Oct. 24, 2023

(54) ORTHODONTIC EXPANSION SCREW

(71) Applicant: Bernhard Foerster GmbH, Pforzheim (DE)

(72) Inventor: Michael Regelmann, Neulingen (DE)

(73) Assignee: Bernhard Foerster GmbH, Pforzheim (DE)

( * ) Notice: Subject to any disclaimer, the term of this patent is extended or adjusted under 35 U.S.C. 154(b) by 0 days.

(21) Appl. No.: 16/947,597

(22) Filed: Aug. 7, 2020

(65) Prior Publication Data

US 2021/0045847 A1     Feb. 18, 2021

(30) Foreign Application Priority Data

Aug. 13, 2019   (DE) ...................... 10 2019 121 790.3

(51) Int. Cl.
*A61C 7/10*        (2006.01)
(52) U.S. Cl.
CPC ...................................... *A61C 7/10* (2013.01)
(58) Field of Classification Search
CPC ..... A61C 7/10; A61M 5/31501; A61M 5/347; A61M 2039/1027; A61M 2039/1033; A61M 2039/1038; A61M 39/283
USPC .......................................................... 433/7
See application file for complete search history.

(56) References Cited

U.S. PATENT DOCUMENTS

| | | | | |
|---|---|---|---|---|
| 742,466 A | * | 10/1903 | Marshall ................. | F16B 39/32 411/953 |
| 961,249 A | * | 6/1910 | Meeker .................... | F16B 39/32 411/941 |
| 3,208,493 A | * | 9/1965 | Holmes .................... | F16B 39/32 411/948 |
| 4,379,693 A | * | 4/1983 | Wallshein ................ | A61C 7/10 433/7 |
| 5,281,133 A | * | 1/1994 | Farzin-Nia ............... | A61C 7/10 433/7 |
| 5,472,344 A | * | 12/1995 | Binder ...................... | A61C 7/10 433/7 |
| 6,499,996 B2 | * | 12/2002 | Forster ..................... | A61C 7/10 433/7 |
| 7,837,465 B2 | | 11/2010 | Foerster | |

(Continued)

FOREIGN PATENT DOCUMENTS

| | | | | |
|---|---|---|---|---|
| CH | 709169 B1 | * | 2/2018 | ............... A61C 7/10 |
| DE | 102004004021 A1 | * | 8/2005 | ............... A61C 7/10 |

(Continued)

*Primary Examiner* — Heidi M Eide

(74) *Attorney, Agent, or Firm* — Orbit IP

(57) ABSTRACT

The orthodontic expansion screw has two bodies, the mutual distance between which can be changed by a spindle means. The spindle has an activating part with a threaded part and is turned into a threaded hole of one of the two bodies. The bodies have a first end, which faces the activating part of the spindle, and a second end, which faces away from the activating part of the spindle. A linear guiding means engage both bodies and guide them while preventing a relative rotation of the bodies and prevent inadvertent twisting of the spindle relative to the bodies. The spindle's threaded part has a recess in which the at least one threaded part is inserted and has an extension externally that contacts the threaded part on a flattened region or in the recess, whereas it elastically presses against the threaded part.

22 Claims, 6 Drawing Sheets

(56) References Cited

U.S. PATENT DOCUMENTS

| | | | | |
|---|---|---|---|---|
| 8,821,156 | B2* | 9/2014 | Ehrenberger | A61C 7/10 |
| | | | | 433/7 |
| 9,283,060 | B2* | 3/2016 | Peuker | B05C 17/0116 |
| 2002/0001789 | A1* | 1/2002 | Forster | A61C 7/10 |
| | | | | 433/7 |
| 2002/0142259 | A1* | 10/2002 | Ceppatelli | A61C 7/10 |
| | | | | 433/7 |
| 2004/0152033 | A1 | 8/2004 | Collins | |
| 2006/0229605 | A1* | 10/2006 | Olsen | A61B 17/66 |
| | | | | 606/54 |
| 2008/0092698 | A1* | 4/2008 | Duncan | B25B 7/123 |
| | | | | 81/378 |
| 2014/0369786 | A1* | 12/2014 | Hsieh | F16B 39/34 |
| | | | | 411/247 |
| 2015/0253091 | A1* | 9/2015 | Gardner | F41A 5/20 |
| | | | | 89/193 |

FOREIGN PATENT DOCUMENTS

| | | | | |
|---|---|---|---|---|
| EP | 0315124 A1 * | 5/1989 | | E21B 33/129 |
| EP | 2596825 A1 * | 5/2013 | | A61M 5/347 |

* cited by examiner

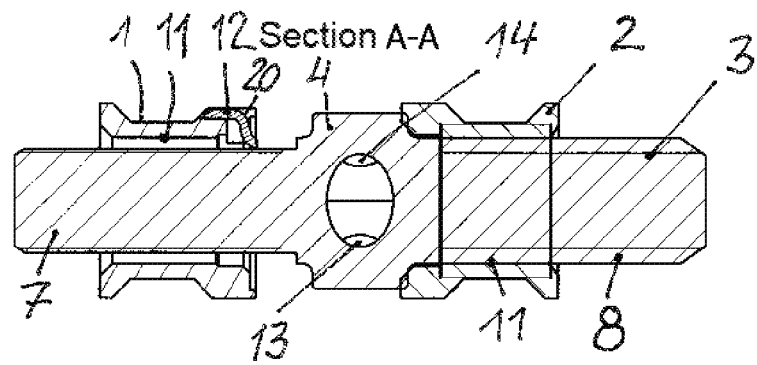
Fig. 2
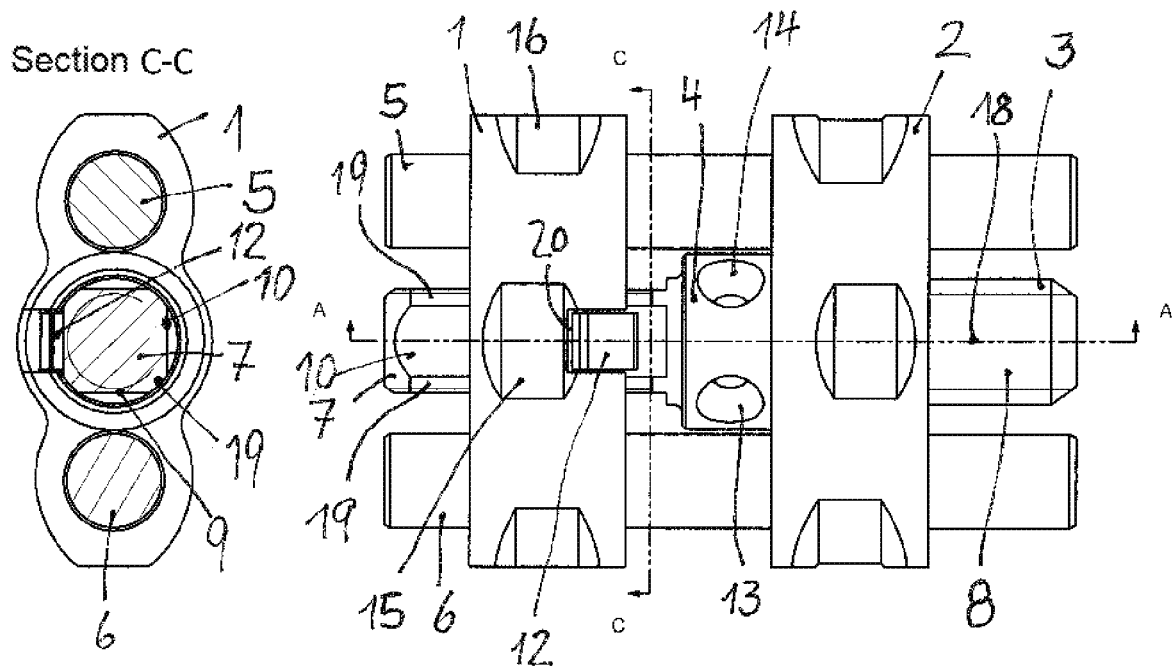
Fig. 5
Fig. 1
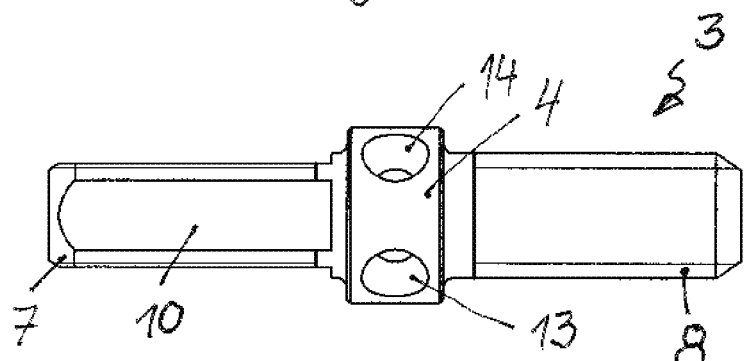
Fig. 7

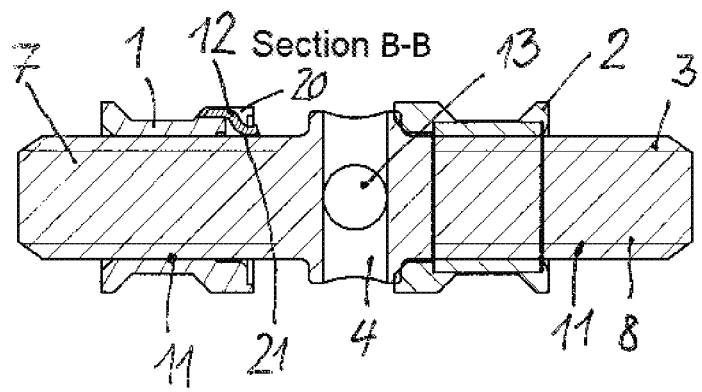
Fig. 4
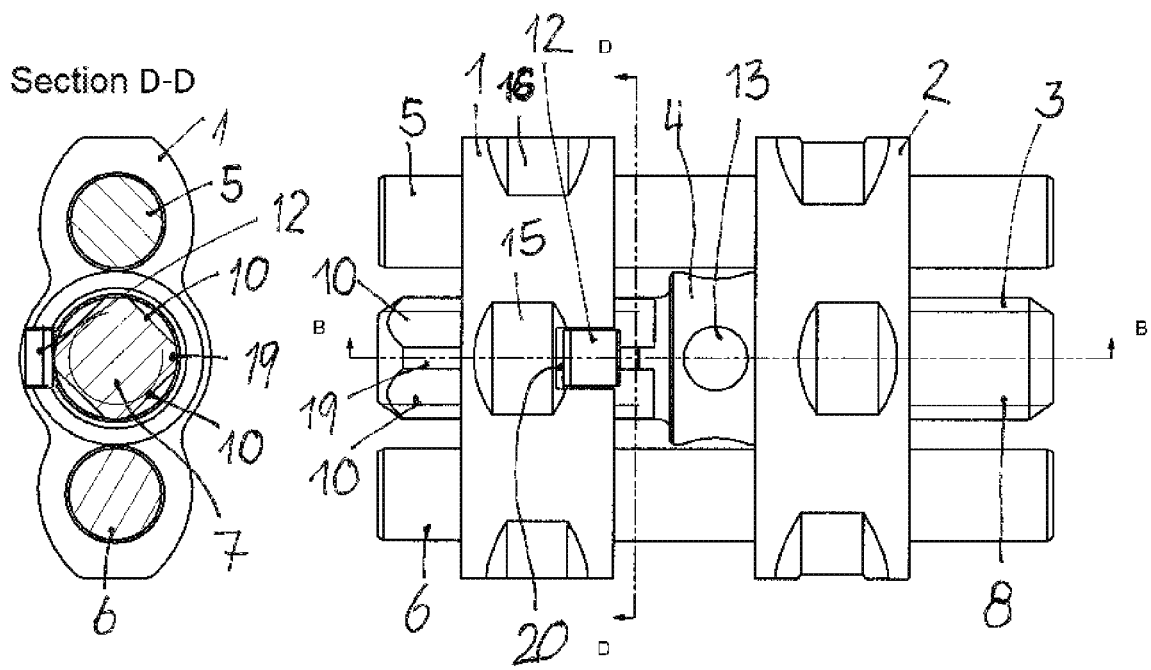
Fig. 6
Fig. 3
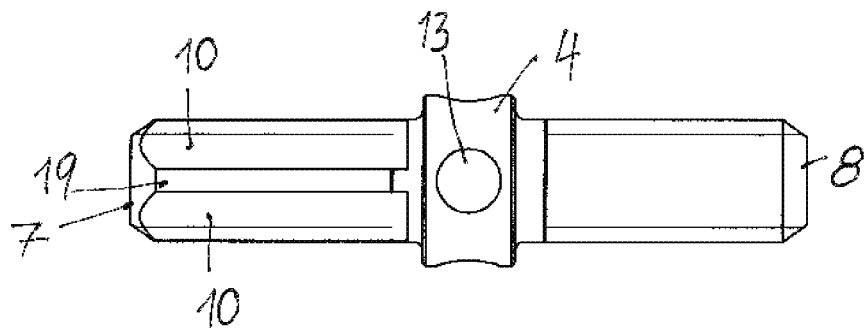
Fig. 8

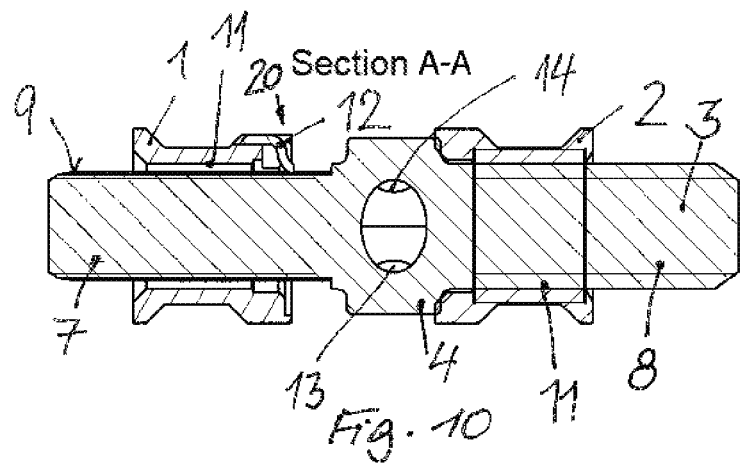
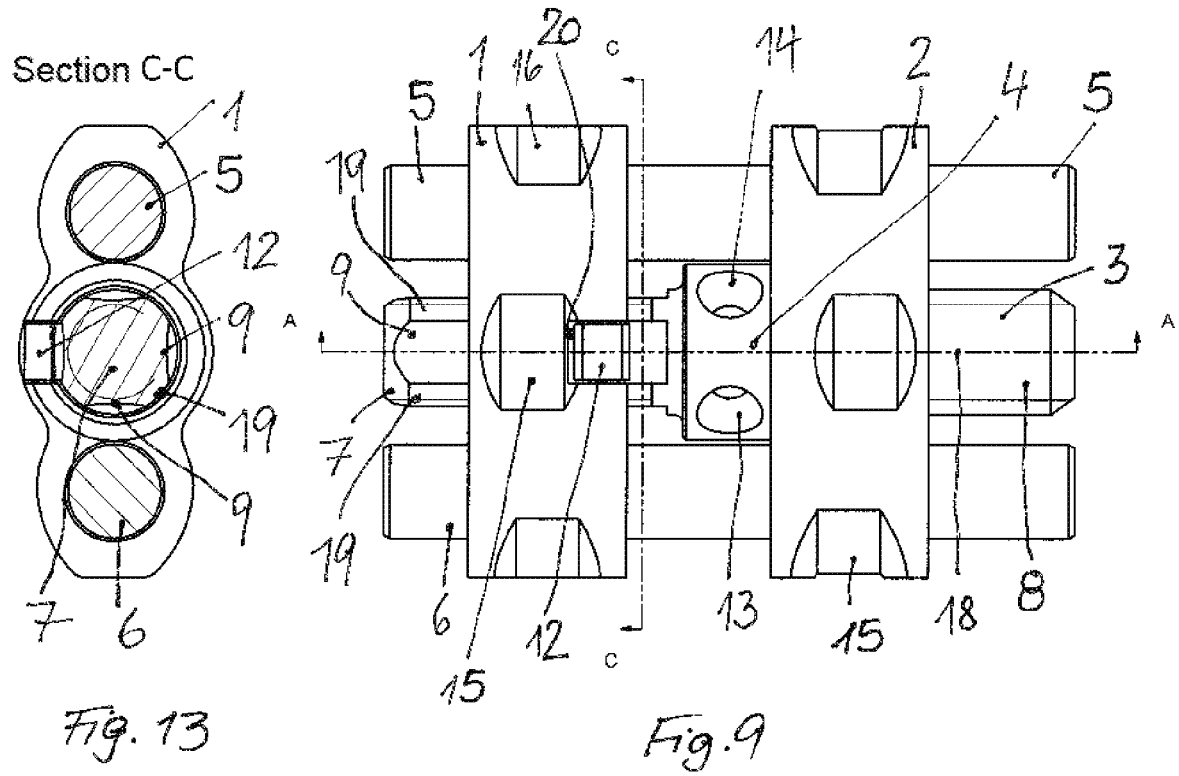
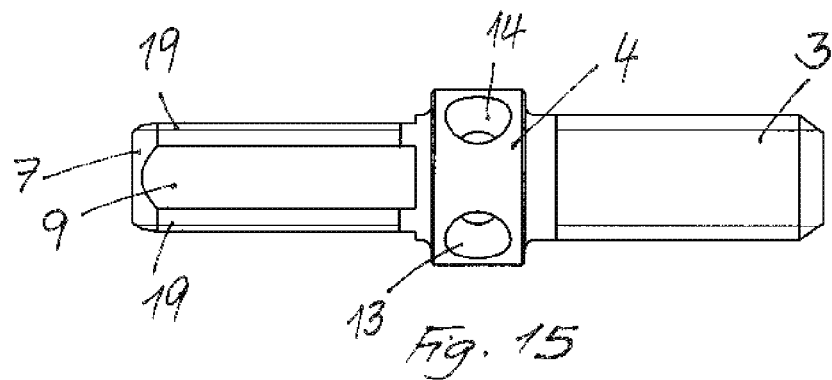

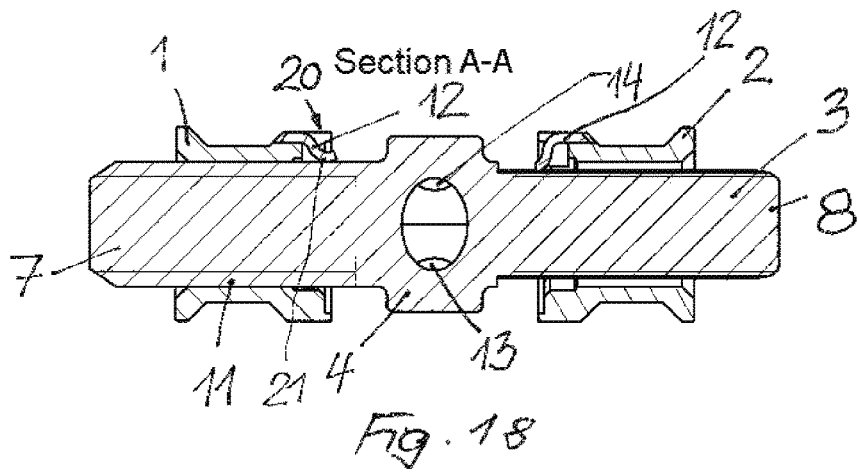
Fig. 18
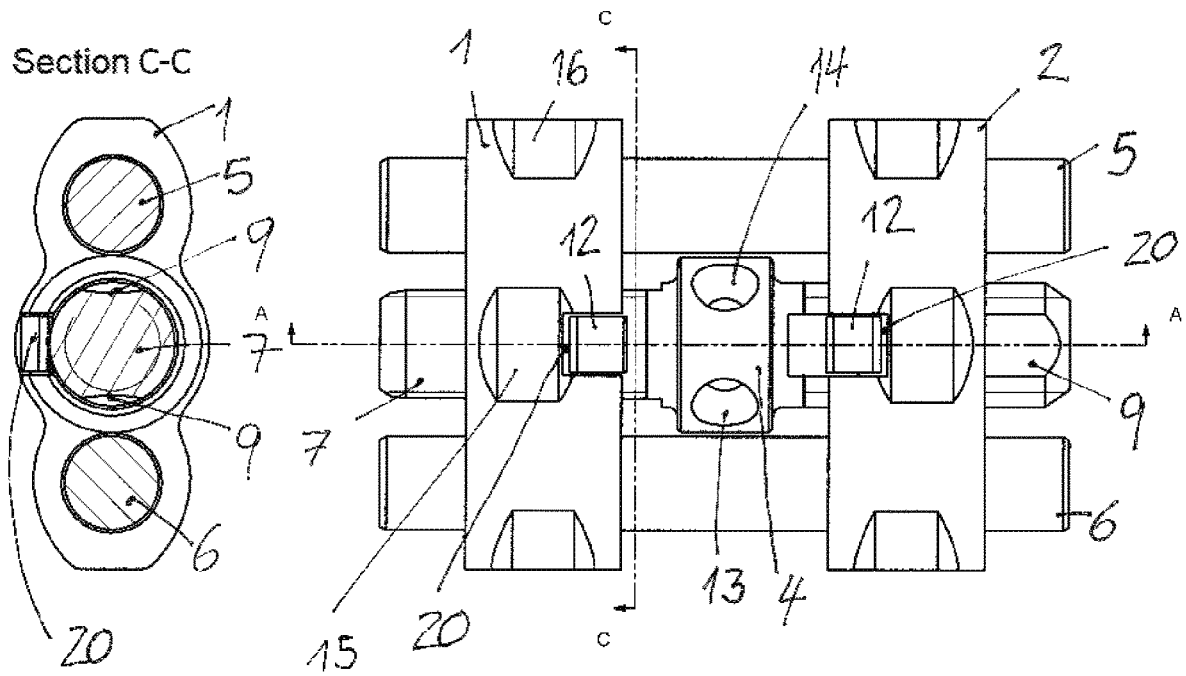
Fig. 21
Fig. 17
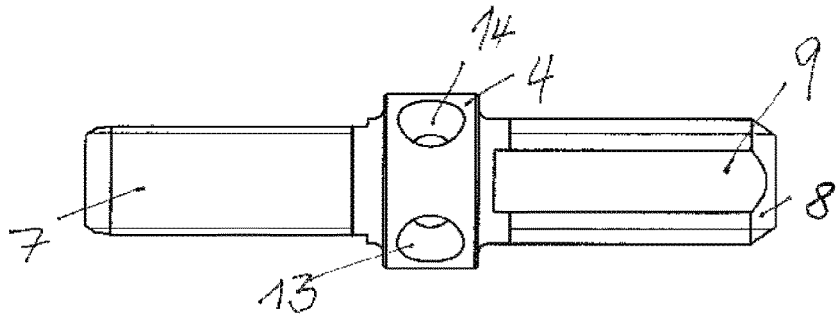
Fig. 23

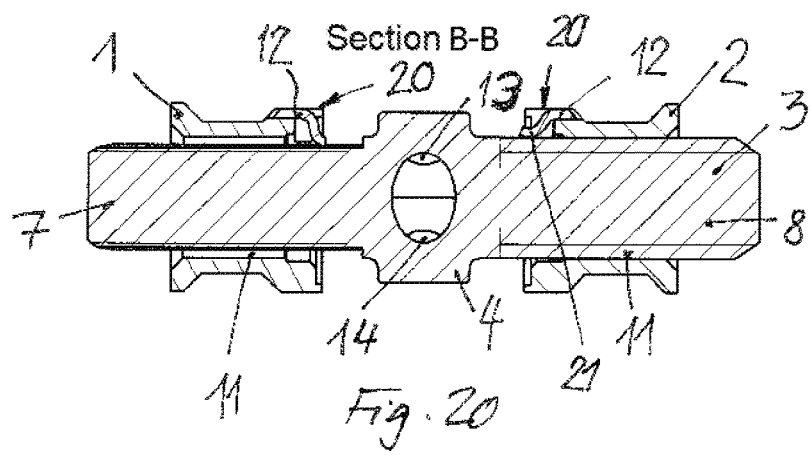
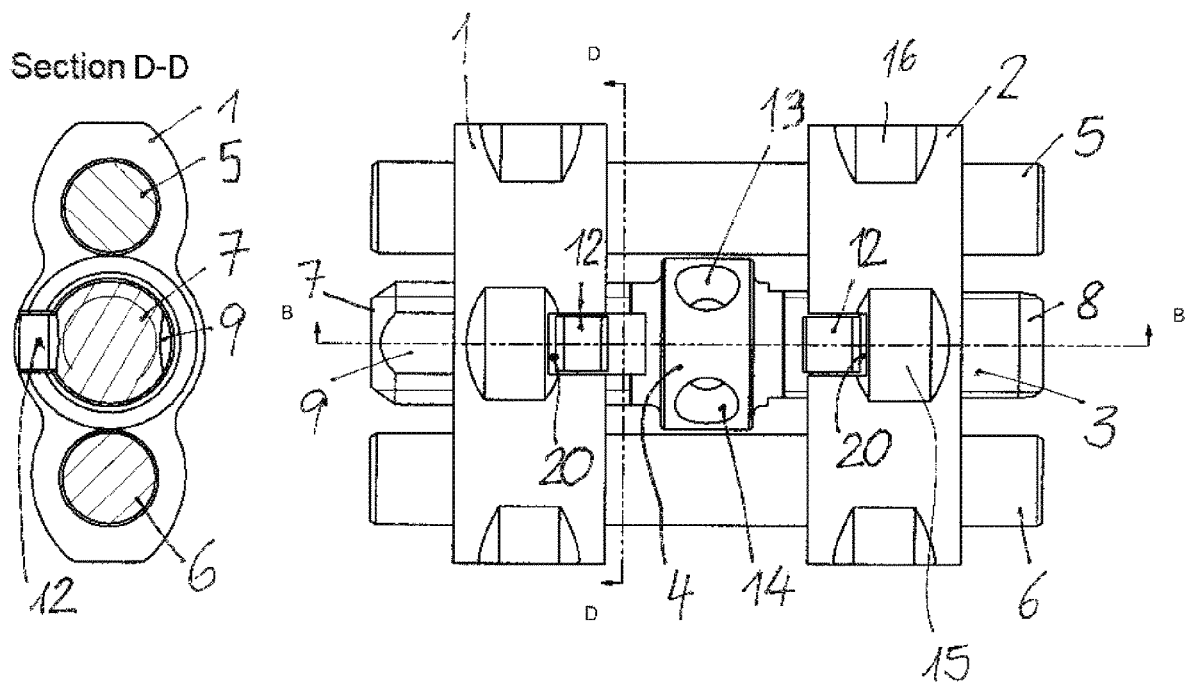
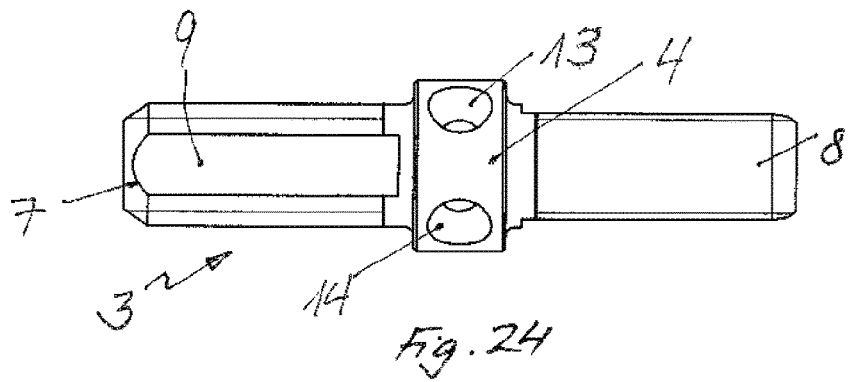

ORTHODONTIC EXPANSION SCREW

CROSS-REFERENCE TO RELATED APPLICATION

This application claims priority to DE 10 2019 121 790.3 filed on Aug. 13, 2019, the contents of which is fully incorporated herein with these references.

DESCRIPTION

Field of the Invention

The present invention generally relates to orthodontics. More particularly, the invention relates to an orthodontic expansion screw.

Background of the Invention

The invention proceeds from an orthodontic expansion screw comprising at least two bodies arranged at a mutual distance that can be changed by means of a spindle, which engages both bodies. The spindle comprises an activating part, from which at least one threaded part proceeds into a threaded hole of one of the two bodies. The bodies have a first end, which faces the activating part of the spindle and a second end, which faces away from the activating part of the spindle. The orthodontic expansion screw further comprises linear guiding means, which engage both bodies and guide them while preventing a relative rotation of the bodies upon a change in their distance relative to each other along two mutually parallel guiding axes, and a device for preventing or impeding an inadvertent twisting of the spindle relative to the bodies. Such an expansion screw is disclosed in U.S. Pat. No. 7,837,465 B2.

In the expansion screw disclosed in U.S. Pat. No. 7,837,465 B2 the activating part of the spindle has an outer cross section that deviates from a circular shape in order to make it harder to inadvertently twist the spindle. A metal strip presses on the activating part in a radial direction, and in so doing acts as a friction brake for the spindle. Thereby the spindle is held in those angular positions in which the metal strip assumes the least distance from the longitudinal axis of the spindle. In this known expansion screw, the ends of the metal strip are fastened to the two linear guiding means, in particular welded thereto. While the metal strip does generate a well-defined obstruction, the disadvantage to this solution is that it requires a component that must be fastened to the linear guiding means, which in the known expansion screw are designed as cylindrical pins.

U.S. Pat. No. 7,837,465 B2 also discloses that an obstruction can be realized by slightly pinching the female thread of the expansion screw body into which a threaded portion of the spindle engages. While this does avoid a separate component, the disadvantage is that the extent of the pinching generated in this way can only be reproduced with difficulty, thus resulting in significant differences in pinching within a series of expansion screws.

SUMMARY OF THE INVENTION

An object of the present invention is to provide a way in which a readily reproducible obstruction of the spindle in prescribed positions of the spindle can be realized in the orthodontic expansion screw without a metal strip that crosses the spindle.

This object is achieved by an orthodontic expansion screw with the features indicated in claim 1.

A second solution for achieving the object based on the same principle is indicated in claim 2.

Advantageous further refinements of the invention are the subject of dependent claims.

The solution according to patent claim 1 achieves a well-defined obstruction of the spindle without a metal strip that crosses the activating part, and avoids the outlay otherwise incurred for its assembly. This is achieved by virtue of the fact that the at least one threaded part of the spindle has at least one recess that extends in the longitudinal direction of the spindle and is open in a radial direction, and that the exterior side of the body in which the at least one threaded part of the spindle is inserted has an springy extension, which is arranged on the first end of the body facing the activating part of the spindle, or on its second end facing the activating part of the spindle. In an embodiment of the invention such a springy or elastic extension may also be arranged both at the first end and at the second end. The extension is directed against the at least one threaded part, and protrudes into the recess in a position of the spindle in which the extension faces the at least one recess, while the extension resiliently presses against the thread of the at least one threaded part of the spindle in positions of the spindle in which the extension does not face any recess in the threaded part.

Contrary to the instruction of U.S. Pat. No. 7,837,465 B2, the desired obstruction of the spindle does not take place by directly exposing the activating part—the spindle head—to a force, but by directly acting on the threaded part of the spindle. In order to achieve the desired obstruction of the spindle, the elastic extension need not be fastened to any of the linear guiding means, and need not press against the thread of the spindle with a uniform force, and need not oppose the spindle rotation with any uniform frictional force. Instead, the obstruction of the spindle comes about by having the extension protrude into the recess formed in the threaded part of the spindle. In the recess, the springy or elastic extension need not press against the threaded part of the spindle, but preferably does so, and specifically less strongly than when pressing against the thread of the spindle outside of the recess. As a consequence, the force that must be exerted to overcome the obstruction of the spindle progressively rises while turning the spindle, until the extension has exited the recess. Due to the formation of the recess, the thread of at least one threaded part of the spindle no longer has a uniform outer diameter.

It is not necessary that both bodies of the expansion screw have an extension. However, if both bodies have an extension, then both threaded parts of the spindle should also have at least one recess into which the respective extension can protrude.

The invention achieves a well-defined and reproducible obstruction in positions of the spindle that depend on the location of the recess in the threaded part.

The expansion screw according to the invention comprises at least two bodies, the distance between which can be changed by a spindle. However, there are also orthodontic expansion screws that have not just a single pair of bodies, the distance between which can be changed by a spindle, but rather have two or three pairs of bodies, the respective distance between which can be changed by a separate, second or third, spindle. Such an expansion screw is referred to as a multisector screw. Two or three pairs of bodies are connected to one assembly therein. The scope of claims 1 and 2 is intended to include multisector screws. For this reason, claims 1 and 2 indicate that the orthodontic expansion screw has "at least two bodies".

The solution indicated in claim 2 differs from the solution indicated in claim 1 in that at least one threaded part of the spindle has a flattened region that extends in the longitudinal direction of the spindle instead of a recess that extends in the longitudinal direction and is open in the radial direction. In those positions of the spindle where its obstruction is to be possible, the extension arranged at one end of the body in which the flattened threaded part of the spindle is located is directed against the flattened region. If the spindle is intentionally twisted out of such an obstructed position, in which the extension is directed toward the middle of the flattened region in relation to the circumferential direction of the spindle, the edge of the flattened region that turns by the extension banks up in front of the extension, until the latter slides onto the non-flattened section of the thread. Accordingly, the force that must be applied to bend the extension against its spring force, and thereby overcome the obstruction of the spindle, progressively rises just as in the solution according to patent claim 1, until the extension has exited the flattened region of the threaded part. A defined and reproducible obstruction is also achieved with the second solution of the object underlying the invention, since the thread of at least one threaded part of the spindle has no constant outer diameter, but rather deviates from a constant outer diameter by a definable level.

If the orthodontic expansion screw has a spindle with two threaded parts that proceed in mutually opposite directions from the activating part, then both bodies of the expansion screw can have an extension, and both threaded parts of the spindle can have a recess or flattened region that extends in the longitudinal direction of the spindle. However, it is basically enough that just one of the threaded parts of the spindle have a recess or a flattened region, and accordingly that only one of the two bodies of the expansion screw have an extension or more than one extension.

The extension is to press against the thread of the threaded part outside of the recess or flattened region of the threaded part of the spindle. The extension may contact the spindle in each of its positions. In the recess or on the flattened region, however, the extension contacts the spindle with a smaller pressure or without pressure, because the floor of the recess and the flattened region are spaced less far apart from the longitudinal axis of the spindle than the radially outer edge of the thread. If the extension is directed against the central longitudinal line of the surface of the recess or flattened region, it need not contact the latter. However, if the extension resiliently presses against the threaded part of the spindle in each position of the latter, there is an advantage in that the spindle has no play, even when the extension presses against the flattened region or into the recess.

The invention is not limited to a specific type of thread.

In order to facilitate the sliding of the extension onto the threaded part of the spindle, the surface of the extension with which it contacts the spindle is preferably convex in design, and extends in the longitudinal direction of the spindle, preferably over a length greater than the pitch of the thread of the spindle.

The recess or flattened region best extends on the threaded part of the spindle over a length that is just as long as the length by which the bodies of the expansion screw can be adjusted by turning the spindle. The recess or flattened region preferably extends over the entire length of the at least one threaded part or both threaded parts.

More than just one recess or flattened region may be present on the threaded part. The more recesses or flattened regions are distributed on the threaded part in the circumferential direction, the more positions there are for the spindle, in which the inadvertent twisting of the spindle can be prevented or impeded. Two diametrically opposed recesses or flattened regions may be present, or four recesses or flattened regions, which diametrically oppose each other in pairs. If two recesses or flattened regions are present, the spindle can be in a position, in which an inadvertent twisting of the spindle is prevented or impeded, before and after a half turn. If four recesses or flattened regions are present on the threaded part, a quarter term has the same effect. In this case, the threaded part is shaped like a square with rounded edges, whose rounded areas accommodate the remaining screw threads of the spindle. Depending on the specific design of the flattened region or recess, the screw threads may extend until into the flattened region or recess, with a tapering thread depth. Thereby is can be ensured that there is enough engagement between the threaded part and the threaded hole that receives it to absorb or transfer the forces arising in the expansion screw during orthodontic treatment.

The ability to retain the spindle, after each quarter turn, in a position in which an inadvertent twisting of the spindle is prevented or impeded can also be achieved when the threaded parts of the spindle only have two diametrically opposed recesses or flattened regions, specifically if the recesses or flattened regions on the one threaded part are offset relative to the recesses or flattened regions on the other threaded part of the spindle by a circumferential angle of 90°, and at least one springy extension is present on both bodies of the expansion screw.

In another embodiment of the invention, the spindle has two threaded parts, which extend in mutually opposite directions proceeding from the activating part, and each have two recesses or flattened regions lying diametrically opposite each other, wherein the recesses or flattened regions on the one threaded part are offset relative to the recesses or flattened regions on the other threaded part by a circumferential angle of 90° around the longitudinal axis of the spindle.

Several extensions can be provided in the expansion screw on one or both bodies, specifically either diametrically arranged on one end of the body, or at both ends of the body. One advantage to this measure is that a spindle obstruction is still ensured even given a potential spring fracture. However, due to the outlay associated therewith, having more than one elastic extension on one body of the expansion screw is usually not advantageous.

The extension present on the one body or on both bodies of the expansion screw is may be a leaf spring. Such a leaf spring can be made out of a spring sheet or spring hinge reproducibly and with slight dimensional tolerances in a punching and embossing process. One end of the leaf spring may be fastened to the outer periphery of the at least one body, e.g. arranged in a groove provided in the body.

In an embodiment of the invention, the device provided to prevent or impede turning may be designed in such a way as to act in both rotational directions of the spindle.

BRIEF DESCRIPTION OF THE DRAWINGS

Illustrative embodiments of the expansion screw according to the invention are schematically depicted in the attached drawings. The same or correlating parts of the expansion screw are labeled with corresponding reference numbers.

FIG. 1 shows a top view of a first expansion screw with a spindle having two threaded parts, of which one has four flattened regions, which lie diametrically opposite each other in pairs, with the spindle in a locked position, FIG. 2 shows the longitudinal section A-A through the expansion screw, FIG. 3 shows a top view of the expansion screw with the spindle in a switch position, FIG. 4 shows the longitudinal section B-B through the expansion screw, FIG. 5 shows the cross section C-C through the expansion screw, FIG. 6 shows the cross section D-D through the expansion screw, FIG. 7 shows a detailed, top view of the spindle of the first expansion screw, in a position as in FIG. 1, FIG. 8 shows a detailed, top view of the spindle of the first expansion screw, but in a position as in FIG. 3, FIG. 9 shows a top view of a second expansion screw having a screw with two threaded parts, of which one has four recesses that lie opposite each other in pairs, with the spindle in a locked position, FIG. 10 shows the longitudinal section A-A through the expansion screw in FIG. 9, FIG. 13 shows the cross section C-C through the expansion screw in FIG. 9, FIG. 15 shows a detailed, top view of the spindle of the second expansion screw in a position as in FIG. 9, FIG. 17 shows a top view of a third expansion screw, in which the spindle has two threaded parts, of which each has two diametrically opposed recesses, wherein the recesses in the one threaded part are offset relative to the recesses in the other threaded part by an angle of 90°, and the spindle is in a locked position with one of its two threaded parts, FIG. 18 shows the longitudinal section A-A through the expansion screw in FIG. 17, FIG. 19 shows a top view of the expansion screw on FIG. 17, wherein the spindle is twisted out of the position shown in FIG. 17 by 90°, FIG. 20 shows the longitudinal section B-B through the expansion screw in FIG. 19, FIG. 21 shows the cross section C-C through the expansion screw in FIG. 17, FIG. 22 shows the cross section D-D through the expansion screw in FIG. 19, FIG. 23 shows a detailed, top view of the spindle of the third expansion screw, in a position as in FIG. 17, and FIG. 24 shows a detailed, top view of the spindle of the third expansion screw, but in a position as in FIG. 19.

DETAILED DESCRIPTION OF THE PREFERRED EMBODIMENTS

Figure 12:
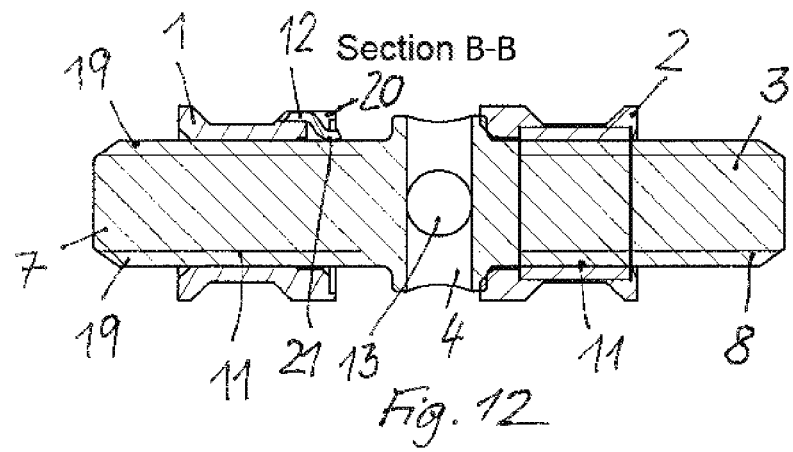
FIG. 12 shows the longitudinal section B-B through the expansion screw in FIG. 10.

The first embodiment of an expansion screw shown in FIGS. 1 to 8 has two preferably identically or essentially identically designed bodies 1 and 2, the distance between which can be changed by means of a spindle 3 having a central activating part 4, from which two threaded parts 7 and 8 with opposite winding directions proceed in mutually opposite directions. The first threaded part 7 is rotatably mounted in the first body 1, and the second threaded part 8 in the second body 2. For this purpose, each of the two bodies 1 and 2 incorporates a continuous threaded hole 11, into which a respective one of the two threaded parts 7 and 8 is turned. Accordingly, the two threaded holes 11 are aligned flush with each other, and have an opposite thread direction corresponding to the two threaded parts 7 and 8. Those of the thread on the two threaded parts 7 and 8 and in the threaded holes 11 have the same pitch.

Provided on both sides of the spindle 3 are two cylindrical guide pins 5 and 6, which are inserted into matching, continuous holes of the two bodies 1 and 2 that align flush with each other in pairs. The guide pins 5 and 6 form linear guiding means, which guide the two bodies 1 and 2 along two mutually parallel guide axes, which in the illustrated example coincide with the longitudinal axes of the guide pins 5 and 6, while preventing a relative rotation of the two bodies 1 and 2 given a change in their distance.

It is not mandatory that both guide pins 5 and 6 be present. In principle, suitable linear guiding means can also be formed by the spindle 3 itself and by a single guide pin parallel to the spindle 3; however, embodiments with two guide pins are preferred due to a symmetrical introduction of the force emanating from the spindle 3 into the two bodies 1 and 2.

In principle, it is also possible to use a spindle with just a single threaded part instead of a spindle 3 with two threaded parts 7 and 8, and in so doing turn the spindle into a threaded hole in only one of the two bodies, and rotatably, but immovably, connect the spindle with the other body of the expansion screw, in particular by virtue of rotatably mounting the activating part of the spindle in a chamber of one of the two bodies of the expansion screw, wherein the single threaded part of the spindle protrudes out of this chamber, and is turned into the threaded hole of the other body of the expansion screw.

In the first embodiment according to FIGS. 1 to 8, the activating part 4 has two through holes 13 and 14 that intersect each other at a right angle, and can be seen on FIGS. 1 to 4. In order to twist the spindle 3, an adjusting tool, for example a pin, can be introduced into the hole 13 or 14, and used as a lever to twist the spindle 3. When the activating part 4 is twisted, the distance between the two bodies 1 and 2 changes, and they slide on the guide pins 5 and 6 in the process, so that the two bodies 1 and 2 are linearly guided, and a turning of the two bodies 1 and 2 relative to each other is prevented.

To prevent the expansion screw from inadvertent changes in the mouth of a patient, where it is used for orthodontic treatment, a device is formed in the expansion screw that prevents or at least impedes an inadvertent turning of the spindle 3 relative to the two bodies 1, 2 in both rotational directions of the spindle 3. For this purpose, one of the two threaded parts, for example the first threaded part 7, is flattened over its entire length in such way as to have the shape of a square with rounded corners as viewed in the longitudinal direction of the spindle 3, see in particular FIGS. 5 and 6. Therefore, the screw threads of the first screw part 7 no longer extend completely around the latter, but rather are essentially confined to the area of the still present "edges" of the shape of a square with rounded "edges" produced by flattening out the first threaded part 7. The flattened regions 10 are not shown to scale on the figures, but instead only in basic terms so as to illustrate their operating principle.

In the illustrated example, a springy or elastic extension 12 is located on at least one of the two bodies 1 and 2 at its one end facing the activating part 4, e.g. on body 1. In the embodiment shown, the extension is a leaf spring 12, which is arranged with one of its two ends in a groove 20, which runs parallel to the longitudinal direction of the spindle 3 on the exterior side of the body 1. The end of the leaf spring 12 arranged in the groove 20 of the body 1 is fixedly connected with the body 1, for example by welding, soldering or adhesive bonding. As shown on FIGS. 3 and 4, the leaf spring 12 is bent into approximately an S shape, and its free end resiliently presses against the threaded part 7 of the spindle 3. As shown on FIG. 4, the free end of the leaf spring 12 has a convex surface 21 that faces the threaded part 7.

The two bodies 1 and 2 of the expansion screw only differ slightly with respect to the contour of their end facing the activating part 4, and in that the first body 1 has the groove 20 in which the one end of the leaf spring 12 is arranged and fixedly connected with the body 1.

FIGS. 1 and 5 show the spindle 3 in a position in which the extension 12 contacts a flattened region 10 of the first threaded part 7 of the spindle 3 on a central line 18, which coincides with the cutting line A-A on FIG. 1. This position is referred to as the locked position below. If the spindle 3 is to be turned out of this locked position, the edge of the flattened region 10 banks up in front of the extension 12, exposing the rotation of the spindle 3 to an obstructive spring force, which increases until the next rounded area 19 of the first threaded part 7 reaches the extension 12. This position of the spindle 3 is shown on FIGS. 3 and 6, and referred to below as the switch position, since the spindle 3 can be turned to the right or left out of the latter and into the next locked position.

The resistance that must be overcome as the spindle 3 twists from one locked position into a switch position can prevent an inadvertent turning of the spindle 3.

In the first embodiment of an expansion screw shown in FIGS. 1 to 8, the spindle 3 turns by a respective 90° from a locked position into the next locked position, so that the distance between the two bodies 1 and 2 of the expansion screw can be changed by the orthopedist by turning the spindle by a respective 90° from one locked position into the next locked position, wherein the change in the distance between the two bodies 1 and 2 depends on the pitch of the thread of the spindle 3.

Figures 11, 14:
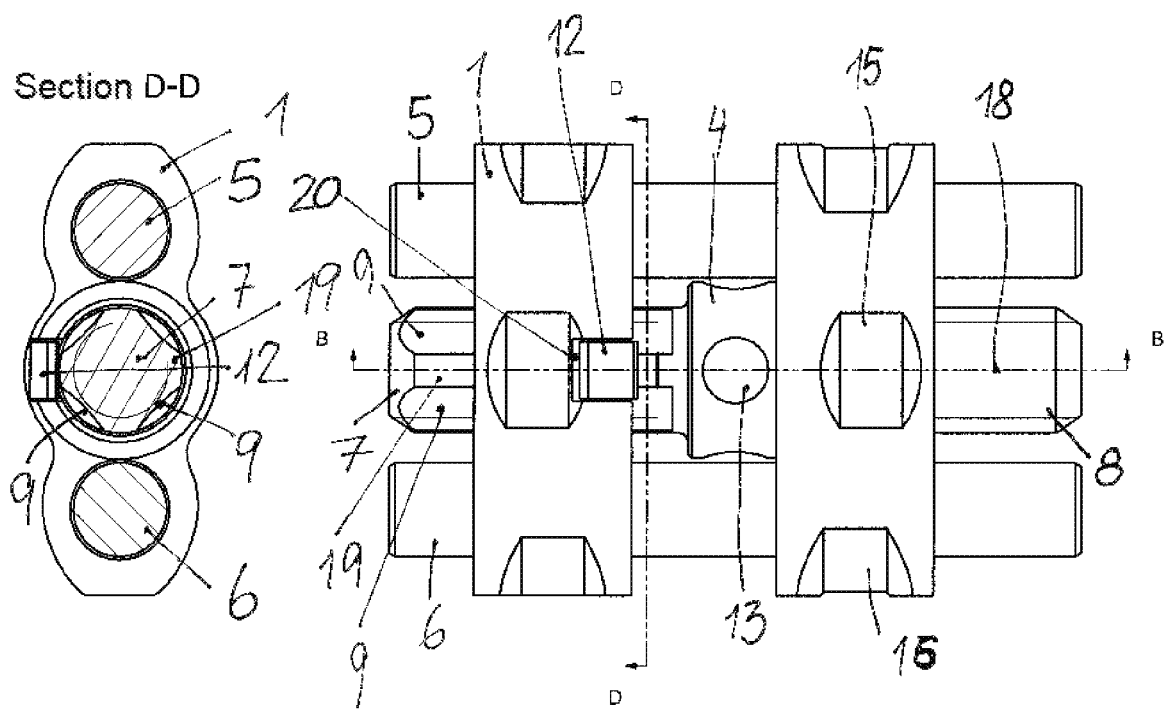
FIG. 11 shows a top view of the expansion screw in FIG. 8 with the spindle in a switch position.
FIG. 14 shows the cross section D-D through the expansion screw in FIG. 11.
Figure 16:
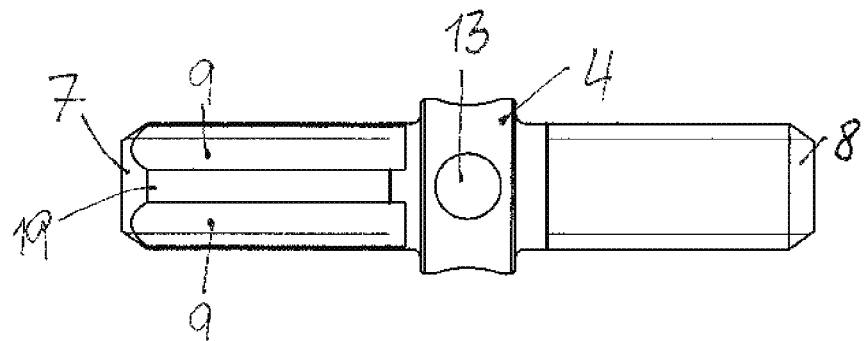
FIG. 16 shows a detailed, top view of the spindle in FIG. 15, but in a position as in FIG. 11.

The second embodiment of an expansion screw shown on FIGS. 9 to 16 only differs from the first embodiment shown on FIGS. 1 to 8 in that, instead of flattened regions 10 of the first threaded part 7 that are bordered by a planar surface, recesses 9 are formed on the first threaded part 7 by concave surfaces, so that the first threaded part 7 has four recesses 9 extending in its longitudinal direction, which lie diametrically opposite each other in pairs, and into which an elastic extension 12 secured to the first body 1 engages. The type of attachment of the extension 12 to the first body 1 is the same as in the first embodiment. As in the first embodiment, the extension 12 is a leaf spring. Given otherwise identical dimensions, however, the spring deflection of the extension 12 is greater than in the first embodiment. As a result, the resistance which the spindle 3 must overcome when being turned out of its locked position (FIG. 9) can be higher than in the first embodiment. Consequently, a stronger obstruction of the spindle 3 can be readily achieved without difficulty for an expansion screw according to the second embodiment than for an expansion screw according to the first embodiment.

Except for the fact that recesses 9 instead of flattened regions 10 are provided on the first threaded part 7 and the leaf spring 12 has a longer spring deflection in the second embodiment, the two embodiments coincide, so that the description of the first embodiment can be referenced for details about the second embodiment.

The third embodiment of an expansion screw according to the invention shown on FIGS. 17 to 22 only differs from the second embodiment in that just two diametrically opposed recesses 9, and not four recesses 9, are formed on the first threaded part 7, and that two additional diametrically opposed recesses 9 are formed on the second threaded part 8, and arranged in such a way as to be offset by 90° in the circumferential direction relative to the recesses 9 in the first threaded part 7. In addition, a respective elastic extension 12 is secured not just to the first body 1, but rather also in the second body 2, at their ends facing the activating part 4. The advantage to this third embodiment of the expansion screw is that more of the thread has remained intact on both thread parts 7 and 8 than in the first and second embodiments on the first threaded part 7. For this reason, the thread of the first threaded part 7 can absorb higher forces than the expansion screw of the second embodiment. Another advantage lies in the fact that both threaded parts 7 and 8 are exposed to roughly the same load. The advantage to the first and second exemplary embodiments has been maintained, specifically that the spindle 3 need only be twisted by 90° from locked position to locked position.

REFERENCE LIST

1 First body
2 Second body
3 Spindle
4 Activating part
5 Linear guiding means, guide pin
6 Linear guiding means, guide pin
7 Threaded part
8 Threaded part
9 Recess
10 Flattened region
11 Threaded hole
12 Extension
13 Cross hole
14 Cross hole
15 Depression
16 Depression
17 Central line
18 Rounded area
19 Groove
20 Convex surface

What is claimed is:
1. An orthodontic expansion screw, comprising:
at least two bodies arranged at a mutual distance that can be changed by means of a spindle, which engages both bodies, wherein the spindle comprises an activating part, from which at least one threaded part proceeds into a threaded hole of one of the two bodies, the bodies having a first end, which faces the activating part of the spindle and a second end, which faces away from the activating part of the spindle;
a linear guiding means, which engage both bodies and guide them while preventing a relative rotation of the bodies upon a change in their distance relative to each other along two mutually parallel guiding axes; and
a device configured for preventing or impeding an inadvertent twisting of the spindle relative to the bodies, the device comprising two or four recesses and a springy extension;

wherein the at least one threaded part of the spindle has the two or four recesses that extends in the longitudinal direction of the spindle and is open in a radial direction; and wherein the body in which the at least one threaded part is inserted has the springy extension externally on its first end and/or on its second end, wherein said springy extension is directed against the at least one threaded part, and protrudes into at least one recess of the two or four recesses when the spindle is in a position in which the springy extension faces the at least one recess, whereas the springy extension presses springily against a thread of the at least one threaded part when the spindle is in a position in which the springy extension does not face the recess;

wherein the activating part is rotatable in opposite directions changing the mutual distance of the bodies overcoming the device configured for preventing or impeding inadvertent twisting of the spindle relative to the bodies;

wherein the two or four recesses are present on the at least one threaded part, and lie diametrically opposite each other in pairs, and wherein the two or four recesses are interposed with rounded edges, in which the thread is formed along the rounded edges; and wherein, when the spring extension protrudes into the at least one recess it does not press against the at least one threaded part.

2. The expansion screw according to claim 1, wherein the springy extension contacts the threaded part of the spindle in each of its positions.

3. The expansion screw according to claim 1, wherein the springy extension has a surface that faces the threaded part of the spindle, and is convex in design.

4. The expansion screw according to claim 1, wherein a surface of the springy extension which contacts the threaded part of the spindle is greater than the pitch of the thread of the spindle in the longitudinal direction of the spindle.

5. The expansion screw according to claim 1, wherein the springy extension is a leaf spring.

6. The expansion screw according to claim 1, wherein the two or four recesses extends over the entire length of the at least one threaded part.

7. The expansion screw according to claim 1, wherein the thread on the rounded edges of the at least one threaded part also extends partially into the at least one recess of the at least one threaded part.

8. The expansion screw according to claim 1, wherein the thread formed along the rounded edges are not formed along the two or four recesses.

9. The expansion screw according to claim 1, wherein a surface area of the four recesses of the at least one threaded part is larger than a surface area of the thread of the at least one threaded part.

10. The expansion screw according to claim 1, wherein, when the springy extension is aligned with the at least one recess, rotation of the spindle engages the springy extension into an obstruction with the recess creating a force that progressively rises while turning the spindle until the extension exists the at least one recess.

11. An orthodontic expansion screw, comprising:
at least two bodies arranged at a mutual distance that can be changed by means of a spindle, which engages both bodies, wherein the spindle comprises an activating part, from which at least one threaded part proceeds into a threaded hole of one of the two bodies, the bodies having a first end, which faces the activating part of the spindle and a second end, which faces away from the activating part of the spindle;

a linear guiding means, which engage both bodies and guide them while preventing a relative rotation of the bodies upon a change in their distance relative to each other along two mutually parallel guiding axes; and a device configured for preventing or impeding an inadvertent twisting of the spindle relative to the bodies, the device comprising two or four flattened regions and a springy extension;

wherein the at least one threaded part of the spindle has the two or four flattened regions that extend in the longitudinal direction of the spindle; and wherein the body in which the at least one threaded part is inserted has the springy extension externally on its first end and/or on its second end, wherein the springy extension is directed against the at least one threaded part and springily presses against a thread of the at least one threaded part when the spindle is in a position in which the springy extension does not face at least one flattened region of the two or four flattened regions, whereas the springy extension does not contact the at least one flattened region or does so with less pressure when the spindle is in a position in which the springy extension is directed against the at least one flattened region than when the spindle is in a position in which the springy extension does not face the at least one flattened region;

wherein the activating part is rotatable in opposite directions changing the mutual distance of the bodies overcoming the device configured for preventing or impeding inadvertent twisting of the spindle relative to the bodies;

wherein the two or four flattened regions are present on the at least one threaded part, and lie diametrically opposite each other in pairs, and wherein the two or four flattened regions are interposed with rounded edges, in which the thread is formed along the rounded edges; and wherein, when the spring extension protrudes into the at least one flattened region, it does not press against that least one threaded part.

12. The expansion screw according to claim 11, wherein the springy extension contacts the threaded part of the spindle in each of its positions.

13. The expansion screw according to claim 11, wherein the springy extension has a surface that faces the threaded part of the spindle, and is convex in design.

14. The expansion screw according to claim 11, wherein a surface of the springy extension which contacts the threaded part of the spindle is greater than the pitch of the thread of the spindle in the longitudinal direction of the spindle.

15. The expansion screw according to claim 11, wherein the springy extension is a leaf spring.

16. The expansion screw according to claim 15, wherein a width of the leaf spring is equal to a width of each of the two or four recesses.

17. The expansion screw according to claim 11, wherein the two or four flattened region extends over the entire length of the at least one threaded part.

18. The expansion screw according to claim 11, wherein, when the flattened region is four flattened regions, the four flattened regions are a square with interposed rounded edges.

19. The expansion screw according to claim 11, wherein the thread on the rounded edges of the at least one threaded part also extends partially into the two or four flattened regions of the at least one threaded part.

20. The expansion screw according to claim 11, wherein the thread formed along the rounded edges are not formed along the two or four flattened regions.

21. The expansion screw according to claim 11, wherein a surface area of the four flattened regions of the at least one threaded part is larger than a surface area of the thread of the at least one threaded part.

22. The expansion screw according to claim 11, wherein, when the springy extension is aligned with the at least one flattened region, rotation of the spindle engages the springy extension into an obstruction with the flattened region creating a force that progressively rises while turning the spindle until the extension has exited the at least one flattened region.

* * * * *